United States Patent [19]

Auten et al.

[11] Patent Number: 5,266,077
[45] Date of Patent: Nov. 30, 1993

[54] METHOD FOR TINTING A HYDROPHILIC CONTACT LENS

[75] Inventors: Richard D. Auten, Cumming; Robert A. Janssen, Alpharetta; Leslie F. Stebbins, Roswell; Richard C. Turek, Atlanta, all of Ga.

[73] Assignee: Ciba-Geigy Corporation, Ardsley, N.Y.

[21] Appl. No.: 973,795

[22] Filed: Nov. 9, 1992

[51] Int. Cl.$^5$ .............................................. D06P 3/52
[52] U.S. Cl. ................................................... 8/507
[58] Field of Search ........................................ 8/507

[56] References Cited

U.S. PATENT DOCUMENTS

| | | | |
|---|---|---|---|
| Re. 27,401 | 6/1972 | Wichterle | 260/2.5 |
| 2,976,576 | 3/1991 | Wichterle | 18/58 |
| 4,559,058 | 12/1985 | Bennett | 8/496 |
| 4,559,059 | 12/1985 | Su | 9/507 |
| 4,668,240 | 5/1987 | Loshaek | 8/507 |
| 4,705,370 | 11/1987 | Johnson | 8/507 |
| 4,872,405 | 10/1989 | Sterman | 8/507 |
| 4,963,159 | 10/1990 | Narducy et al. | 8/507 |
| 4,963,160 | 10/1990 | Hung | 8/507 |

FOREIGN PATENT DOCUMENTS

| | | |
|---|---|---|
| 262832 | 4/1988 | European Pat. Off. . |
| 393532 | 10/1990 | European Pat. Off. . |
| 409440 | 1/1991 | European Pat. Off. . |
| 472496A2 | 2/1991 | European Pat. Off. . |
| WO8504679 | 10/1985 | PCT Int'l Appl. . |

OTHER PUBLICATIONS

G. N. Sheth, *Journal of Applied Polymer Science*, vol. 30, pp. 4659–4668, 1985.

*Primary Examiner*—Marianne M. Cintins
*Assistant Examiner*—John Peabody
*Attorney, Agent, or Firm*—Edward McC. Roberts; William Hervey

[57] ABSTRACT

A method of tinting an unhydrated contact lens involves the steps of providing an unhydrated contact lens; providing a dyestuff solution; providing a printing block comprising a hydrophilic polymer material containing a dye complexing agent capable of noncovalently bonding the dyestuff; placing the dyestuff solution onto the printing block; contacting the unhydrated contact lens and the printing block for a time sufficient to allow the dyestuff solution to diffuse to the lens; and removing the lens from the printing block.

5 Claims, 1 Drawing Sheet

METHOD FOR TINTING A HYDROPHILIC CONTACT LENS

BACKGROUND OF THE INVENTION

This invention relates to contact lenses and to a method for their preparation. More particularly, this invention relates to a method of applying tint or other dyestuff to a hydrophilic contact lens while the lens is in its xerogel, or "dry," state.

Tinted or otherwise dyed contact lenses are used as means for cosmetically altering eye color, as well as for providing means for aiding in the visualization of the lens itself. A problem exists, however, in that many of the known methods for tinting or otherwise dying plastic materials are unsuitable for practical coloring of hydrophilic (commonly referred to as "soft") contact lenses. For example, the blending of dye into the lens material is not useful because the presence of water in the hydrophilic polymer encourages migration and leaching of the dye through and out of the lens body. Therefore, it has become desirable in the industry to utilize a method which involves placing the dye on an outer surface of an otherwise standard, clear ("untinted") lens.

A number of techniques have been used to place colorant on the outside surface of a clear lens. One approach has been the use of printing, transfer or coating methods. According to this process, a coloring agent is caused to adhere to the surface of the plastic lens. However, this process is not well suited for coloring water-absorbable materials as used in soft contact lenses. First, there exists a tendency for the dye to form blotches towards the center of the lens, particularly in the area of the lens corresponding to the pupil of the wearer. Also, if a dry hydrophilic lens colored by this method is allowed to swell in water, the applied layer of coloring agent does not swell as much as the plastic itself. Consequently, the coloring agent will become dissociated from the surface of the lens, thereby creating deformation and cosmetic defects in the product. One method of overcoming this problem has been to use standard dot matrix printing techniques, thereby allowing spaces between the dots which allow for swelling of the lens. However, while such a method may allow printing on a dry lens, the resulting product does not have a solid covering of tint and is therefore artificial looking.

One method of providing a solid cover of color on a clear lens without deformation has been to apply the colorant while the lens is in its hydrated state. In this method, a hydrated lens is placed into a fixture having three interlocking pieces. A bottom piece is a dome upon which the lens is positioned, a top piece rests over the lens and acts as a reservoir for the dye solution, and a third piece for housing the top and bottom pieces. The entire fixture is then inserted into a clamp, and the dye solution is placed into the reservoir. The dye solution is allowed to remain in contact with the lens until the desired shade is obtained. The reservoir is then purged with water until all traces of the dye solution have been removed. The lens is then removed from the fixture. This method is disclosed in U.S. Pat. No. 4,559,058 to Su. This method is problematic, however, in that it is labor and space intensive, wastes dye solution and requires a large amount of purging water.

There exists a need, therefore, for a method of providing a solid cover of dye onto a contact lens which can be performed when the lens is in its xerogel state.

There also exists a need for such a method which eliminates the problem of blotching of dye at the center of the lens.

There is a further need for such a method which is inexpensive, clean and environmentally efficient.

SUMMARY OF THE INVENTION

The present invention relates to a method of providing a solid cover of dyestuff to a hydrophilic contact lens in its xerogel state without blotching or other cosmetic defects. The term "solid color" is used herein to denote a lens incorporating tint in its centermost portions, as opposed to those having an untinted pupil zone, and also a lens wherein the tinting area is free of the spaces associated with dot matrix printing techniques.

According to the method, a controlled amount of a dyestuff is applied to a printing block made of a hydrophilic polymer containing a dye complexing agent capable of noncovalently bonding the dyestuff. The lens is then contacted with the printing block for a period of time to allow the dyestuff to diffuse into the lens. Preferably, the lens is also made of a material containing a dye complexing agent capable of noncovalently bonding the dyestuff. Thereafter, the block and lens are separated, and the dyestuff is then allowed to fix with the lens. This method will provide a solid covering of tint onto the lens without blotching or other cosmetic defects associated with prior art printing methods. This is especially useful when the dyestuff is intended to absorb ultraviolet radiation, since in such instances covering the pupil is critical to the working of the lens.

In addition, the present invention can easily be incorporated into a production process which is quick and inexpensive. The necessity of filling mold-reservoirs for each lens is eliminated, thereby resulting in a clean and environmentally efficient workplace.

DETAILED DESCRIPTION OF THE INVENTION

Figure 1:
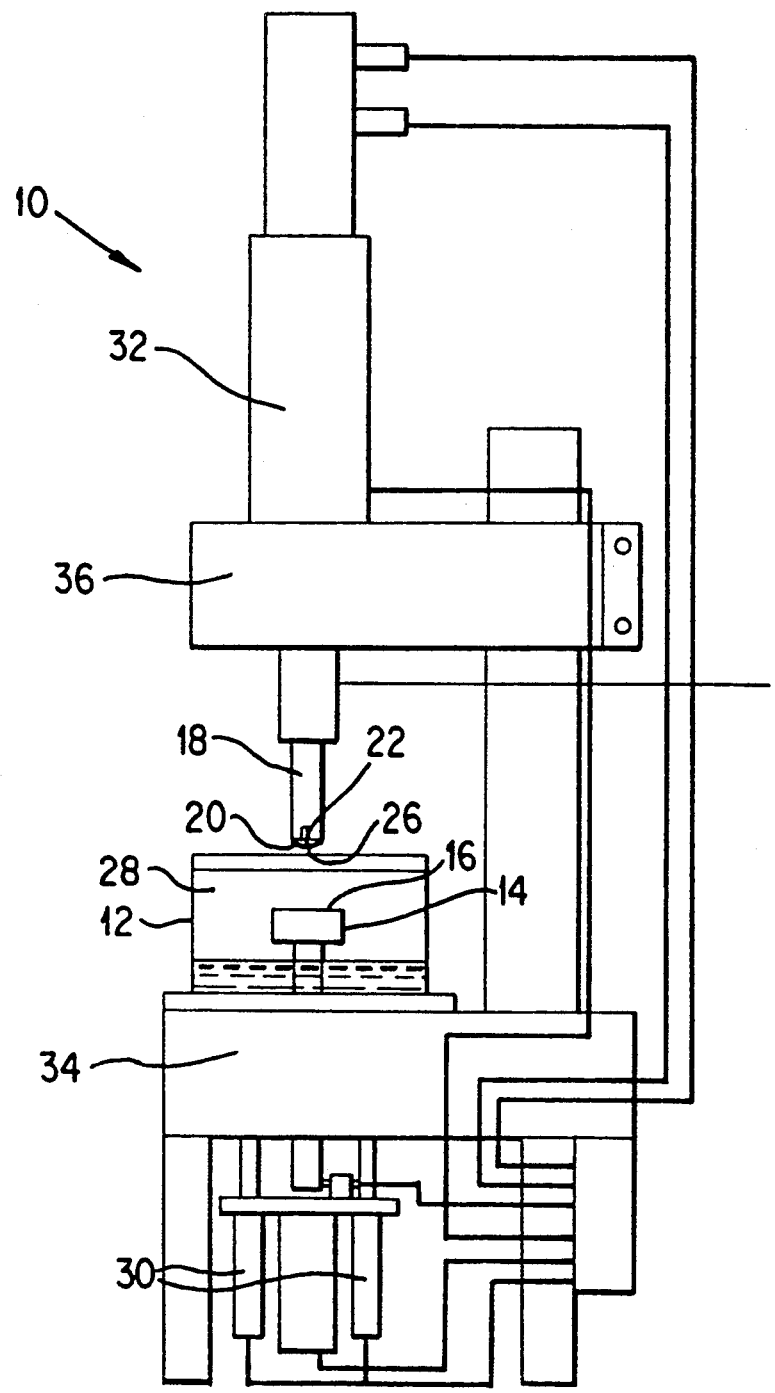
FIG. 1 illustrates an apparatus for performing the method of the present invention.

The present invention relates to a method of tinting a contact lens in its xerogel, or "unhydrated", state by contacting the lens with a printing block containing a dyestuff, wherein both the contact lens and the printing block are made of materials containing a dye complexing agent capable of noncovalently binding the dyestuff.

A complexing agent is defined as a compound that possesses the ability of forming complexes with a dye or dyes. The dye complexing property is theorized to occur due to either van der Wall's forces or hydrogen bonding between the dye anion and the complexing agent. Examples of dye complexing agents include, but are not limited to polyvinyl pyrolidone (PVP), polymethylvinyl pyridine (MVP), methacryloxypropyl ammonium cellulose, (2-hydroxy-3-methacryloyloxypropyl)-trimethylammonium chloride, glycidyltrimethylammonium chloride and poly (2-methylallyl-n-guanidylketamine). Complexing agents are discussed in more detail in G.N. Sheth, *Journal of Applied Polymer Science*, Vol. 30, pp. 4659-4668, 1985, incorporated herein by reference.

Besides having the capacity to be complexed by a dye complexing agent provided in the printing block, the dyestuff used in the present invention should be in solution and capable of being fixed to the material comprising the contact lens. While other dyestuffs may be used, it is preferred that it be a reactive dye which can be covalently bonded to the monomer units of the contact lens polymer backbone. Such dyestuffs are described in detail in U.S. Pat. No. 4,559,059 to Su, incorporated herein by reference. The dyestuff may also be a UV absorbing dye such as described in U.S. Pat. No. 4,963,160 to Hung, incorporated herein by reference. Typically, the solution should contain about 10 parts dye to 100 parts U.S.P. water. The solution should be buffered to an acid pH for vinylsulfone reactive dyes and to a neutral pH for chlorotriazine dyes. Also, purified dye may be used in order to obtain desired tint intensity.

In general, any hydrophilic material suitable for use in the preparation of a contact lens can be used in accordance with the present invention, so long as the dyestuff is capable of being fixed with the material and the material contains a complexing agent capable of complexing the dyestuff with which the lens is to be tinted. For example, reactive dyes as described above are capable of fixing with a number of hydrophilic materials so long as there is present in the monomer mixture a component which will provide the polymer with the required functional groups. Examples of such functional groups include hydroxyl, amino, amide and mercapto groups. Suitable monomers include hydroxyalkyl esters of polymerizable unsaturated acids, such as acrylic, methacrylic, fumaric and maleic acids. In addition to hydroxyalkyl esters of unsaturated acids, other comonomers which can be used in conjunction with monomers providing the required functional groups include alkyl and cycloalkyl acrylates and methacrylates; N-(1,1-dimethyl-3-oxobutyl)acrylamide; and heterocyclic N-vinyl compounds containing a carbonyl functionality adjacent to the nitrogen in the ring, such as N-vinyl pyrolidone.

The preferred lens material contains hydroxyethyl methacrylate and is disclosed in U.S. Pat. No. 2,976,576 and U.S. Pat. No. Re. 27,401. The material also contains contains polyvinyl pyrolidone, a complexing agent capable of complexing a large number of dyes, including those described in the Su and Hung patents referenced above.

The printing block is also made of a polymeric hydrophilic material containing a complexing agent capable of complexing the dyestuff. It is preferrable, although not necessary, that the printing block be made of the same material as the lens. For example, when a lens made of the HEMA based material is to be tinted, it is preferred that the printing block also be made of the HEMA based material. Table 1 shows two examples of printing block formulations useful according to the present invention.

| COMPONENT | BLOCK A weight % | BLOCK B weight % |
| --- | --- | --- |
| HEMA | 39.08 | 29.10 |
| Hydroxyethyl methacrylate | | |
| PVP K-60 | 26.84 | 19.98 |
| Polyvinyl pyrolidone K-60 | | |
| MAA | 0.81 | 0.60 |
| Methacrylic acid | | |
| EDGMA | 0.38 | 0.28 |
| Ethylene glylcol dimethacrylate | | |
| WATER | 32.80 | 50.00 |
| BME | 0.10 | 0.10 |
| Benzoin methyl ether | | |

The methodology to prepare the printing block for use is to hydrate it for a time greater than about 5 days in PBS, then placing the block in the respective aqueous dye solution for a time greater than about 2 days. Once the dye is equilibriated in the printing block material, the block is ready for use.

FIG. 1 illustrates an example of an apparatus for performing the present invention.

FIG. 1 shows an apparatus 10 which includes a dyestuff holder 12 having a reservoir 28 in which a quantity of dyestuff solution, as described above, is placed. The dyestuff holder 12 is held in place by a base 34. A printing block 14 having a printing surface 16 is attached to means for raising and lowering the block, for example pneumatic cylinders 30. The printing block 16 is made of a material containing a complexing agent capable of complexing the dyestuff.

A lens holder 18 is provided having a lens holding surface 20. A vacuum opening 22 is located on the surface 20 and is attached to means for creating a vacuum. The lens holder 18 is attached to means for raising the lens holder away from the printing block 14 and lowering the lens holder towards the printing block 14, such as stepper motor assembly 32. A stepper base 36 is provided for maintaining the position of the lens holder 18 and the motor assembly 32.

At the beginning of the tinting process, as shown in FIG. 1, the lens holder 18 is in raised position and the means for creating a vacuum is activated, thereby creating a vacuum at the vacuum opening 22. The contact lens 26 which is to be tinted is provided to the lens holding surface 20, where it is held in place by the vacuum.

The printing block 14 is lowered into the reservoir 28 by the means for raising and lowering the printing block so that the printing surface 16 is immersed in the dyestuff solution. The printing block 14 is then raised out of the solution with the printing surface 16 retaining a predetermined amount of dyestuff, and simultaneously the lens holder 18 is lowered until the lens 26 contacts the printing surface 16, as shown in FIG. 3. If so desired, a doctor blade may be used to remove excess dye from the block 16. The contact should be maintained for a period of about up-to thirty seconds, depending on desired color intensity, so as to allow the dyestuff to sufficiently diffuse to the lens. Once the predetermined amount of dyestuff is transferred to the lens 26, the printing block 14 is again lowered into the reservoir and the lens holder 18 is raised. The vacuum is then deactivated and the lens 26 is removed from the surface 20, whereafter the dyestuff is fixed and otherwise processed according to the method described in U.S. Pat. No. 4,559,058. Alternatively, the lens may be placed in 2 Normal sodium hydroxide for 15 minutes at 50° C. A second lens can then be placed onto the surface 20, and the printing block 14 can be raised as above to repeat the process.

What is claimed is:

1. A method of tinting an unhydrated contact lens, comprising the steps of:
   a) providing an unhydrated contact lens;
   b) providing a dyestuff solution;
   c) providing a printing block comprising a hydrophilic polymer material containing a dye complexing agent capable of noncovalently bonding the dyestuff;
   d) placing the dyestuff solution onto the printing block;
   e) contacting the unhydrated contact lens and the printing block for a time sufficient to allow the dyestuff solution to diffuse to the lens; and
   f) removing the lens from the printing block.

2. The method of claim 1, and further comprising removing excess dyestuff solution from the printing block prior to contacting the printing block and the lens.

3. The method of claim 1, and further comprising the step of, prior to contacting the printing block and lens, first hydrating the printing block in buffered saline and then placing the printing block in the dyestuff solution for a sufficient time to allow the tinting solution to equilibriate.

4. The method of claim 1, and further comprising the step of placing the lens containing the dyestuff in an activating solution to cause the dyestuff to attach to the lens 5. The method of claim 1, wherein the lens comprises a hydrophilic polymer material containing a dye complexing agent capable of noncovalently bonding the dyestuff.

* * * * *